US012485358B2

(12) United States Patent
Wei et al.

(10) Patent No.: US 12,485,358 B2
(45) Date of Patent: Dec. 2, 2025

(54) LOCK DEVICE FOR GAME MACHINE

(71) Applicant: PAOKAI ELECTRONIC ENTERPRISE CO., LTD., Kaohsiung (TW)

(72) Inventors: Ming-Shan Wei, Kaohsiung (TW); Tung-Ying Wei, Kaohsiung (TW)

(73) Assignee: PAOKAI ELECTRONIC ENTERPRISE CO., LTD., Kaohsiung (TW)

( * ) Notice: Subject to any disclaimer, the term of this patent is extended or adjusted under 35 U.S.C. 154(b) by 228 days.

(21) Appl. No.: 18/406,603

(22) Filed: Jan. 8, 2024

(65) Prior Publication Data

US 2025/0135361 A1 May 1, 2025

(30) Foreign Application Priority Data

Oct. 27, 2023 (TW) ................................ 112211628

(51) Int. Cl.

*A63F 13/98* (2014.01)
*A63F 9/30* (2006.01)
*G07F 17/32* (2006.01)
*G07F 9/06* (2006.01)

(52) U.S. Cl.

CPC ................ *A63F 13/98* (2014.09); *A63F 9/30* (2013.01); *G07F 17/3216* (2013.01); *G07F 17/3253* (2013.01); *G07F 17/3297* (2013.01); *A63F 2250/142* (2013.01); *G07F 9/06* (2013.01)

(58) Field of Classification Search

CPC ............. G07F 17/3297; G07F 17/3253; G07F 17/3216; G07F 9/06; A63F 9/30; A63F 2250/142; A63F 13/98

See application file for complete search history.

(56) References Cited

U.S. PATENT DOCUMENTS 4,145,978 A * 3/1979 Johnson .................. E05G 1/026 292/214
4,718,667 A * 1/1988 Shoemaker, Jr. ......... A63F 9/30 212/320
5,090,750 A * 2/1992 Lindqvist .............. E05B 65/087 292/DIG. 20
5,271,628 A * 12/1993 Okada ..................... G07F 17/32 221/210
5,415,417 A * 5/1995 Reis, Jr. .................. G07F 17/32 273/447

(Continued)

*Primary Examiner* — William H McCulloch, Jr.

(74) *Attorney, Agent, or Firm* — Birch, Stewart, Kolasch & Birch, LLP

(57) ABSTRACT

A lock device includes a lock seat, a lock cylinder, an actuating plate, an extension plate, a guide plate, and hooks. The lock seat is fixed to a window panel. The lock cylinder is connected to the lock seat. The actuating plate extends from the lock cylinder. The extension plate is connected to the window panel. The guide plate extends from the extension plate over the actuating plate. The hooks are connected to the extension plate and engageable with engagement slots of a main housing. Each hook has an inclined guide surface. When the lock cylinder rotates, the actuating plate moves the guide plate and the hooks so that the hooks are disengaged from the engagement slots to unlock the window panel. The inclined guide surface is slidable to the main housing to move the extension plate when the window panel is to be locked.

4 Claims, 5 Drawing Sheets

(56) References Cited

U.S. PATENT DOCUMENTS

| | | | | | |
|---|---|---|---|---|---|
| 5,527,044 | A * | 6/1996 | Lee | G07F 17/3297 | 273/448 |
| 5,791,700 | A * | 8/1998 | Biro | E05C 9/043 | 292/DIG. 20 |
| 5,941,364 | A * | 8/1999 | Wei | G07F 9/06 | 232/16 |
| 6,135,261 | A * | 10/2000 | Noell, Jr. | G07F 9/06 | 194/350 |
| 6,176,041 | B1 * | 1/2001 | Roberts | E05C 9/045 | 70/130 |
| 6,234,487 | B1 * | 5/2001 | Shoemaker, Jr. | B25J 15/0246 | 273/447 |
| 6,428,008 | B1 * | 8/2002 | Singer | B60P 3/025 | 273/447 |
| 6,588,760 | B2 * | 7/2003 | Carter, Jr. | G07F 17/3297 | 273/448 |
| 6,729,662 | B2 * | 5/2004 | Wang | E05C 1/04 | 292/42 |
| 6,899,337 | B2 * | 5/2005 | Fisher | A63F 9/30 | 273/447 |
| 7,063,326 | B1 * | 6/2006 | Smart | G07F 17/32 | 273/447 |
| 7,635,131 | B2 * | 12/2009 | Fukazawa | A63F 9/24 | 273/447 |
| 7,841,599 | B2 * | 11/2010 | Todokoro | G07F 17/32 | 273/447 |
| 9,003,843 | B2 * | 4/2015 | Header | E05B 1/003 | 70/95 |
| 10,720,008 | B2 * | 7/2020 | Tsai | G07F 17/3216 | |
| 10,930,124 | B2 * | 2/2021 | Farnes | G08B 25/008 | |
| 11,107,325 | B2 * | 8/2021 | Harris | G07F 17/3255 | |
| 11,145,163 | B2 * | 10/2021 | Harris | G07F 17/42 | |
| 11,200,781 | B2 * | 12/2021 | Harris | G07F 17/3239 | |
| 11,423,742 | B2 * | 8/2022 | Harris | G07F 17/3255 | |
| 11,568,704 | B2 * | 1/2023 | Harris | G07F 17/3262 | |
| 11,688,228 | B2 * | 6/2023 | Harris | G07F 17/3209 | 463/25 |
| 11,798,383 | B2 * | 10/2023 | Farnes | G08B 29/046 | |
| 11,842,600 | B2 * | 12/2023 | Harris | G07F 17/3211 | |
| 11,854,339 | B2 * | 12/2023 | Harris | G07F 17/3267 | |
| 12,106,626 | B2 * | 10/2024 | Harris | G07F 17/3213 | |
| 12,315,326 | B2 * | 5/2025 | Harris | G07F 17/3253 | |
| 12,367,735 | B2 * | 7/2025 | Harris | G07F 17/3211 | |
| 2003/0090065 | A1 * | 5/2003 | Carter, Jr. | G07F 17/3297 | 273/447 |
| 2006/0094489 | A1 * | 5/2006 | Fukazawa | A63F 9/24 | 463/7 |
| 2019/0340870 | A1 * | 11/2019 | Tsai | G07F 17/3216 | |
| 2025/0135361 | A1 * | 5/2025 | Wei | A63F 13/98 | |
| 2025/0191449 | A1 * | 6/2025 | Fukazawa | G07F 17/3216 | |
| 2025/0198201 | A1 * | 6/2025 | Wei | E05B 65/006 | |

* cited by examiner

LOCK DEVICE FOR GAME MACHINE

CROSS-REFERENCE TO RELATED APPLICATION

This application claims priority to Taiwanese Utility Model Patent Application No. 112211628, filed on Oct. 27, 2023, the entire disclosure of which is incorporated by reference herein.

FIELD

The disclosure relates to a lock device, and more particularly to a lock device for a game machine.

BACKGROUND

A claw machine is a type of an arcade game. The claw machine allows a player to operate a claw or other similar structures to pick up a targeted prize from a pile of prizes in a housing of the claw machine and to move the targeted prize to an outlet of the claw machine. Since the housing needs to be frequently replenished with prizes, the claw machine has to include a transparent window panel that is operable to open and close the housing. The transparent window panel may include two windows mounted to the housing, and the windows are slidable and lockable to each other to open and close the housing. Alternatively, the transparent window panel may be pivotally connected to the housing, and the claw machine may include a lock device to lock the transparent window panel to the housing.

However, the lock device may cause the transparent window panel not to be firmly locked to the housing. A prize of the pile of prizes in the housing may be stolen through an edge of the transparent window panel. In addition, the lock device needs a key to lock the transparent window panel to or to unlock the transparent window panel from the housing. After the transparent window panel is locked to the housing, the key may remain with the transparent window panel, thereby causing inconvenience and resulting in safety uncertainty.

SUMMARY

Therefore, the disclosure is to provide a lock device that can alleviate at least one of the drawbacks of the prior art.

According to the disclosure, a lock device is adapted to be mounted in a game machine. The game machine includes a main housing that is formed with a plurality of engagement slots spaced apart from each other in a top-bottom direction. Each of the engagement slots is elongated in the top-bottom direction. The game machine further includes a window panel that is pivotally connected to the main housing. The lock device includes a lock unit and an engaging unit.

The lock unit includes a lock seat, a lock cylinder, and an actuating plate. The lock seat is adapted to be fixed to the window panel. The lock cylinder is rotatably connected to the lock seat, is adapted to extend perpendicularly through the window panel, and has opposite front and rear ends adapted to be respectively disposed within and outside of the main housing. The actuating plate is fixed co-rotatably to the rear end of the lock cylinder and extends perpendicularly from the lock cylinder.

The engaging unit includes an extension plate, a guide plate, and a plurality of hooks. The extension plate is adapted to be connected to the window panel, and is adapted to slide upwardly and downwardly relative to the window panel. The guide plate extends from the extension plate, is adapted to be parallel to the window panel, and is disposed over the actuating plate. The hooks are connected to the extension plate, are adapted to extend perpendicularly away from the window panel, and are adapted to engage respectively and removably with the engagement slots to lock the window panel to the main housing. Each of the hooks has an inclined guide surface that faces away from and is inclined relative to the extension plate.

When the lock cylinder rotates, the actuating plate is driven to rotate to move the guide plate and the hooks upwardly so that the hooks are allowed to be disengaged from the engagement slots to unlock the window panel from the main housing.

The inclined guide surface of each of the hooks is adapted to be in sliding contact with the main housing to consequently move the extension plate upwardly when the window panel is pivoted to be locked to the main housing.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
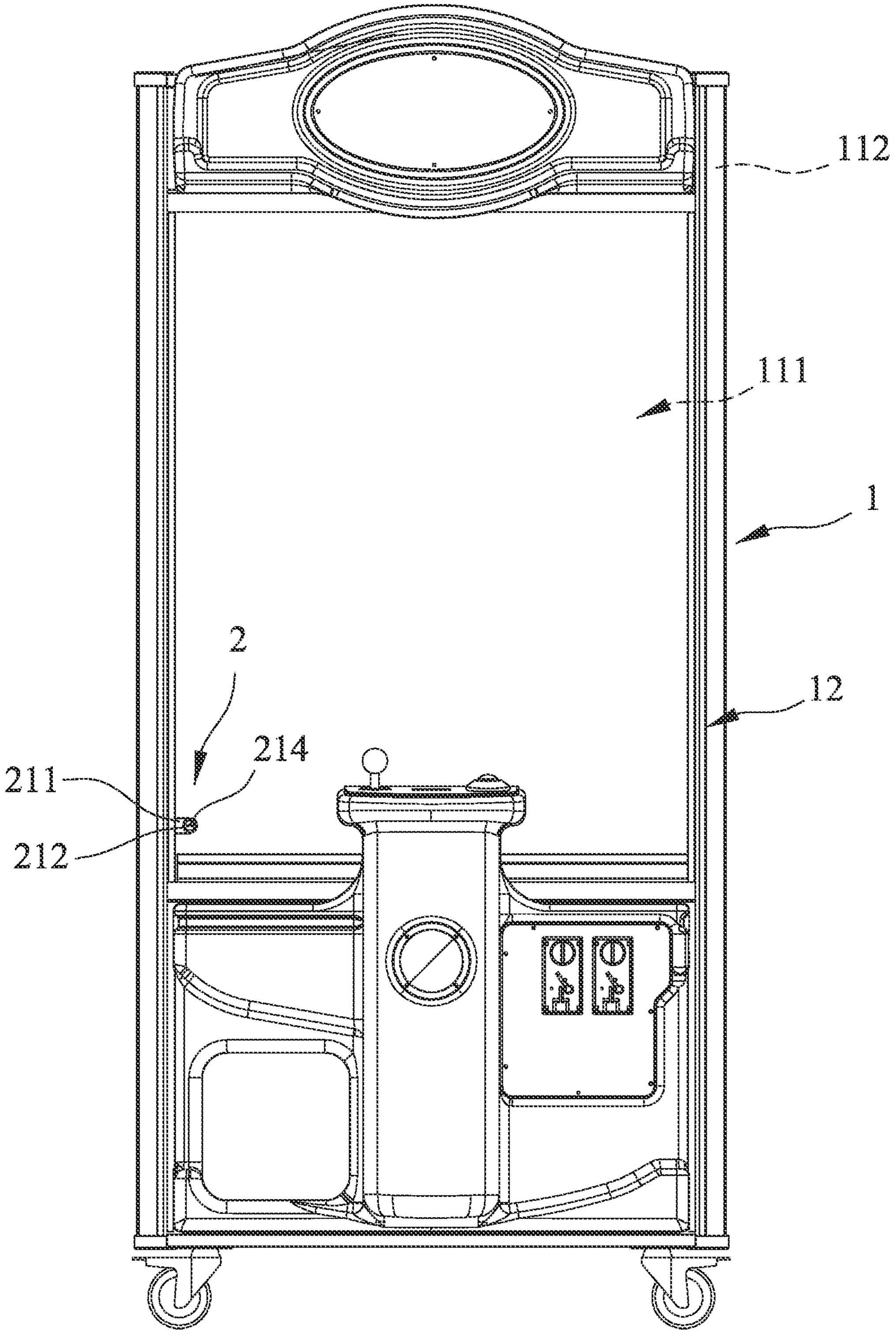
FIG. 1 is a front view illustrating a lock device according to an embodiment of the disclosure to be mounted in a game machine.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
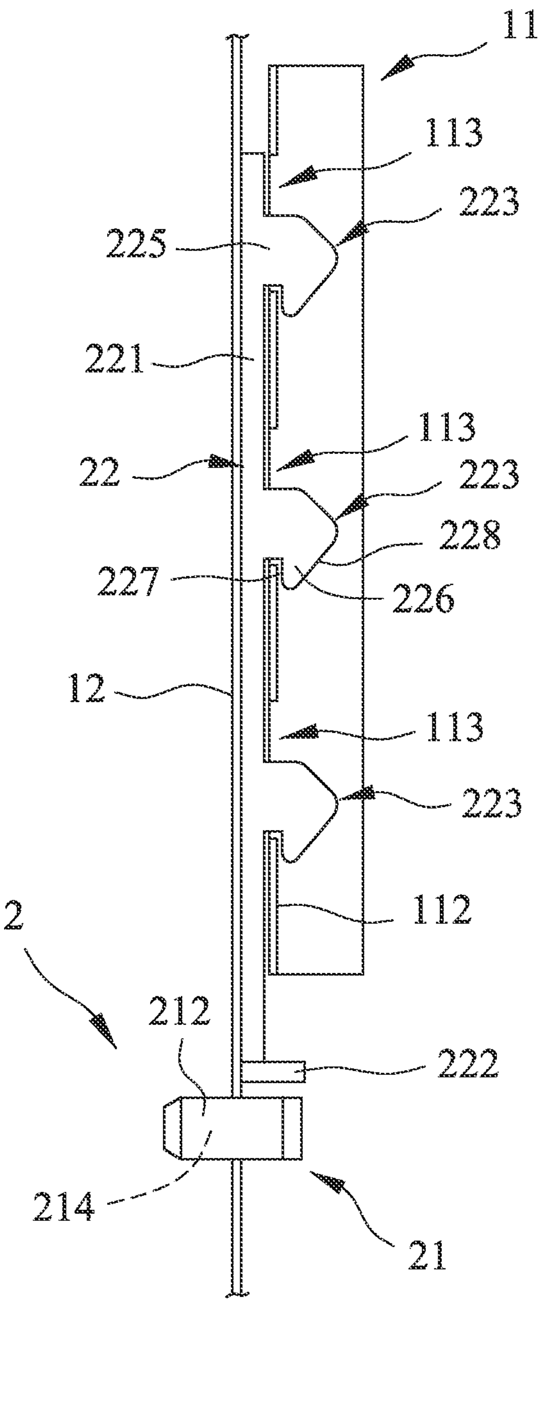
FIG. 2 is a fragmentary schematic view of the embodiment, illustrating the lock device connected to a window panel that is pivotally connected to a main housing of the game machine.

FIGS. 1 and 2 illustrate a lock device 2 according to an embodiment of the disclosure adapted to be mounted in a game machine 1. The game machine 1 includes a main housing 11 and a window panel 12 that is pivotally connected to the main housing 11. The main housing 11 defines an inner space 111 and has a wall 112. The wall 112 is formed with three engagement slots 113 that are spaced apart from each other in a top-bottom direction. Each of the engagement slots 113 is elongated in the top-bottom direction. The window panel 12 is operable to close the inner space 111.

Figure 3:
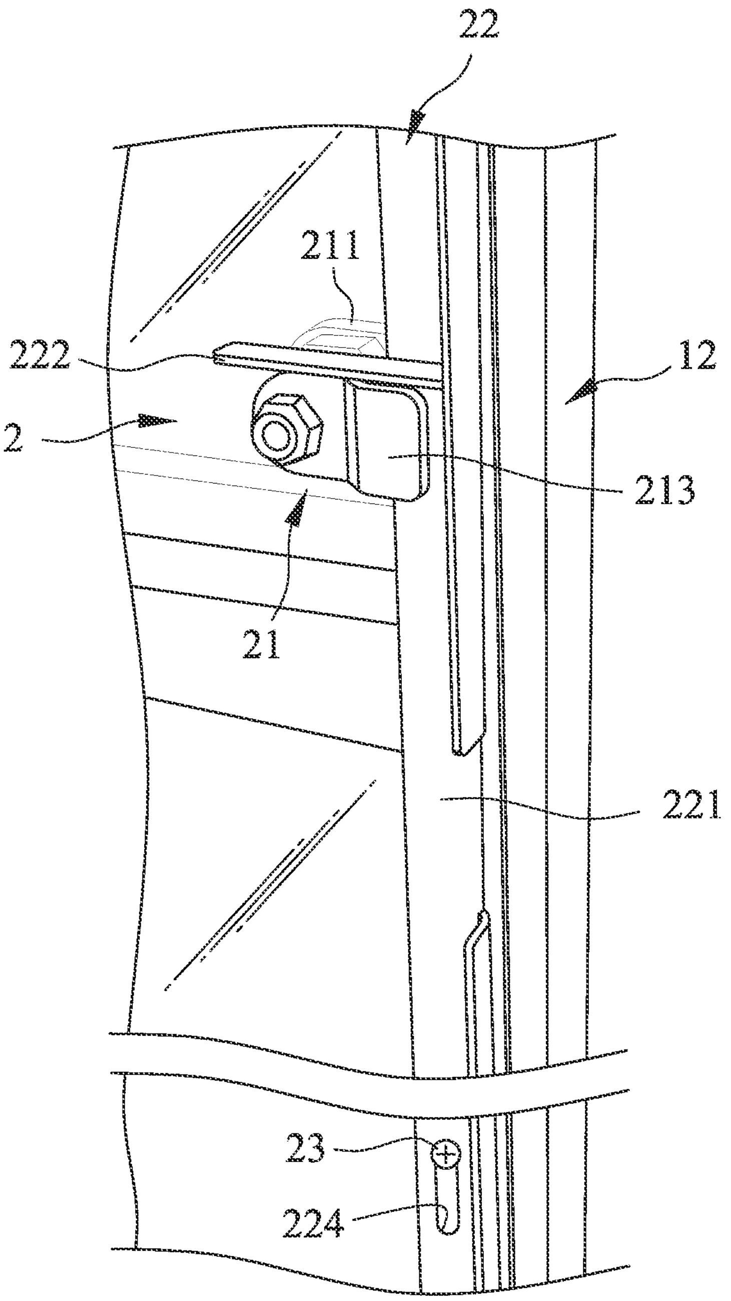
FIG. 3 is a fragmentary perspective view of the embodiment, illustrating a lock unit and an engaging unit of the lock device connected to the window panel.

Referring to FIG. 3 in combination with FIGS. 1 and 2, the lock device 2 includes a lock unit 21, and an engaging unit 22.

The lock unit 21 includes a lock seat 211, a lock cylinder 212, and an actuating plate 213. The lock seat 211 is adapted to be fixed to the window panel 12. The lock cylinder 212 is rotatably connected to the lock seat 211, is adapted to extend perpendicularly through the window panel 12, and has opposite front and rear ends adapted to be respectively disposed within and outside of the main housing 11. The actuating plate 213 is fixed co-rotatably to the rear end of the lock cylinder 212 and extends perpendicularly from the lock cylinder 212. In this embodiment, the lock cylinder 212 further has a key hole 214 that is formed in the front end of the lock cylinder 212 outside the window panel 12 and the inner space 111.

The engaging unit 22 includes an extension plate 221, a guide plate 222, and three hooks 223. The extension plate 221 is adapted to be connected to the window panel 12, and is adapted to slide upwardly and downwardly relative to the window panel 12. The guide plate 222 extends from the extension plate 221, is adapted to be parallel to the window panel 12, and is disposed over the actuating plate 213. The hooks 223 are connected to the extension plate 221, are adapted to extend perpendicularly away from the window panel 12, and are adapted to engage respectively and removably with the engagement slots 113 to lock the window panel 12 to the main housing 11. In this embodiment, the extension plate 221 is formed with three sliding slots 224 (only one is shown in FIG. 3) that is elongated in the top-bottom direction. The lock device 2 further includes a plurality of limiting members 23 (only one is shown in FIG. 3). Each of the limiting members 23 is a bolt that extends perpendicularly through a respective one of the sliding slots 224 and that is adapted to be secured onto the window panel 12. By virtue of the limiting members 23 extending through the sliding slots 224, the extension plate 221 is connected in an untightened manner to the window panel 12 such that the extension plate 221 is slidable upwardly and downwardly relative to the window panel 12.

As shown in FIG. 2, each of the hooks 223 includes a connecting body portion 225 and a hook portion 226. The connecting body portion 225 is connected to the extension plate 221. The hook portion 226 extends downwardly from a distal end of the connecting body portion 225 opposite to the extension plate 221, and has an inclined guide surface 228 and an upright surface 227. The inclined guide surface 228 faces away from and is inclined relative to the extension plate 221. The upright surface 227 faces the extension plate 221 and has a bottom end connected to the inclined guide surface 228. A top end of the upright surface 227 is connected to the connecting body portion 225. As the window panel 12 is locked to the main housing 11, because the connecting body portions 225 of the hooks 223 extend respectively through the engagement slots 113 in a direction perpendicular to the window panel 12, and because the upright surfaces 227 of the hook portions 226 of the hooks 223 face the wall 112, the hooks 223 are hooked to the main housing 11. When the window panel 12 tends to move away from the main housing 11, because the upright surfaces 227 of the hook portions 226 abut against the wall 112 of the main housing 11, the window panel 12 is prevented from being unlocked from the main housing 11 and closes the inner space 111.

Figure 4:
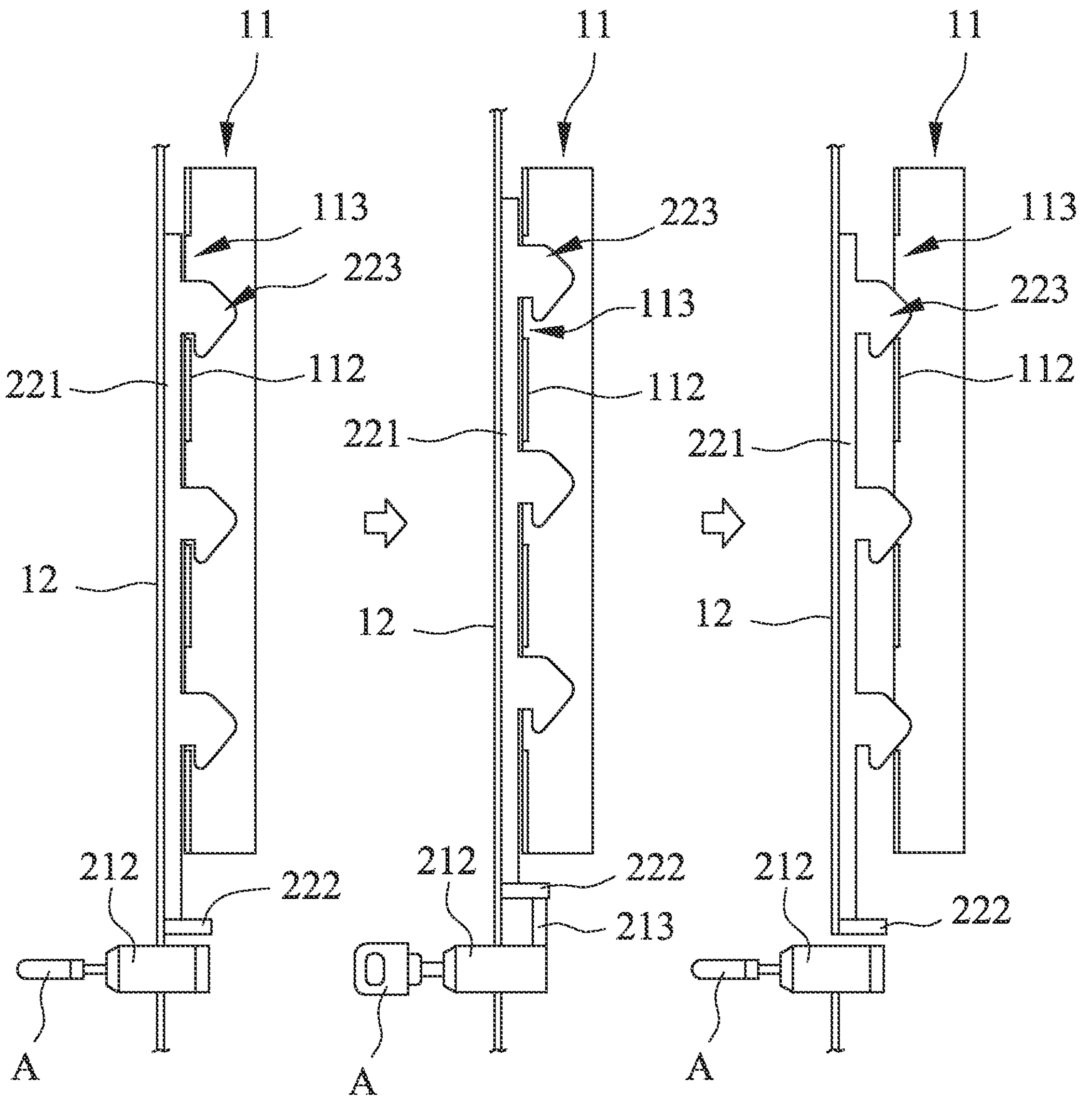
FIG. 4 schematically illustrates how the lock device of the disclosure unlocks the window panel from the main housing according to the embodiment.

Referring to FIG. 4 in combination with FIGS. 2 and 3, to unlock the window panel 12 from the main housing 11, a key (A) is inserted into the key hole 214 of the lock cylinder 212 and is rotated 90 degrees in a first rotary direction, thereby rotating the lock cylinder 212 in the first rotary direction. When the lock cylinder 212 is driven to rotate in the first rotary direction, the actuating plate 213 is driven to rotate to move the guide plate 222 and the hooks 223 upwardly, so that the hooks 223 are allowed to be disengaged from the engagement slots 113 in a manner where the upright surfaces 227 of the hook portions 226 are moved away from the wall 112 to unlock the window panel 12 from the main housing 11. After the window panel 12 is unlocked from the main housing 11, the key (A) may be rotated 90 degrees in a second rotary direction opposite to the first rotary direction, thereby driving the lock cylinder 212 to rotate in the second rotary direction, so that the actuating plate 213 is driven to rotate in the second rotary direction to move the guide plate 222 and the hooks 223 downwardly together with the extension plate 221. As a result, the inclined guide surfaces 228 of the hook portions 226 of the hooks 223 may be in sliding contact with the wall 112 of the main housing 11 in a manner where the upright surfaces 227 of the hook portions 226 face away from the wall 112, and the key (A) may be removed from the lock cylinder 212.

Figure 5:
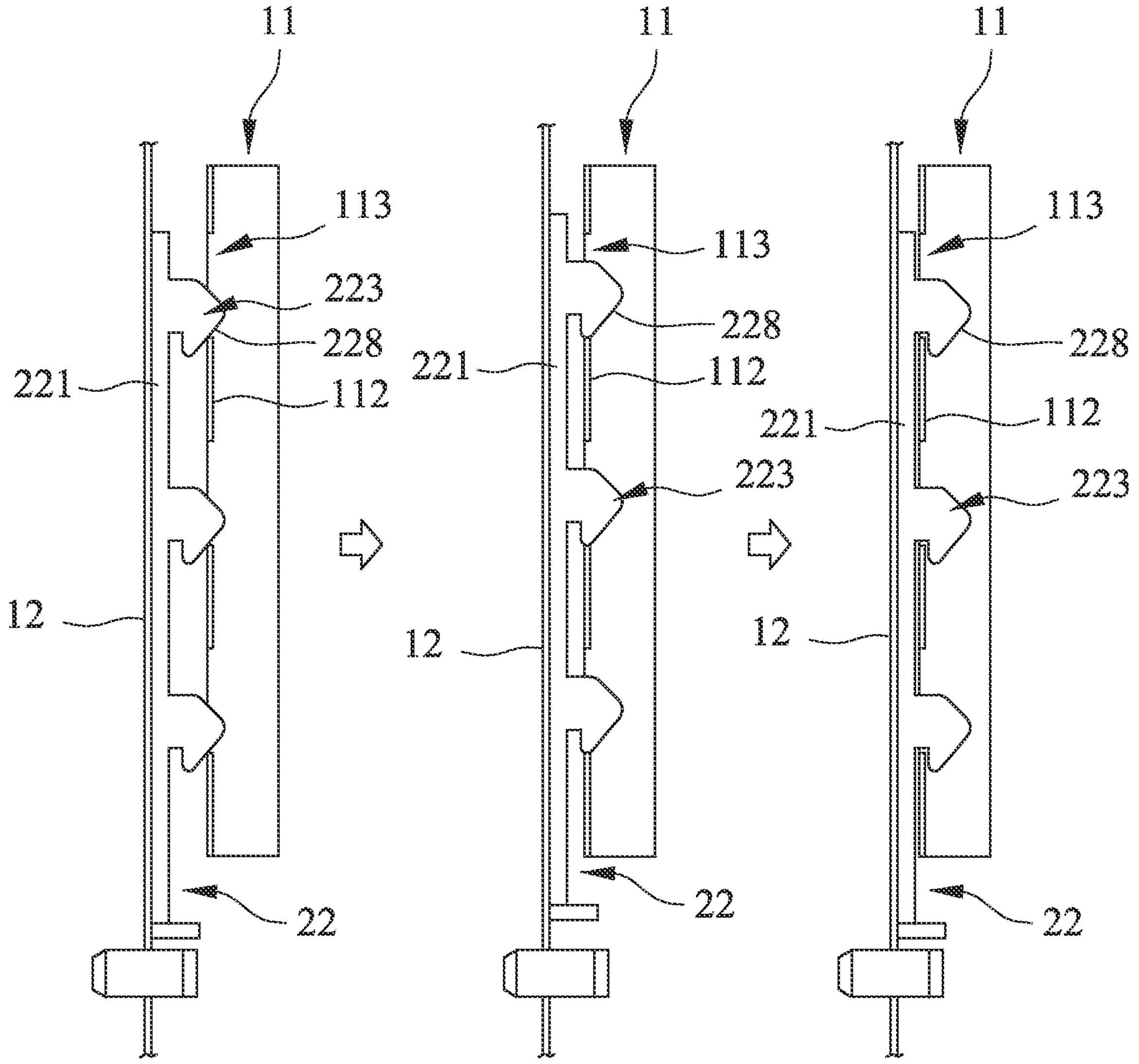
FIG. 5 schematically illustrates how the lock device of the disclosure locks the window panel to the main housing according to the embodiment.

Referring to FIG. 5 in combination with FIGS. 1 and 3, the lock device 2 does not need the key (A) to lock the window panel 12 to the main housing 11. When the window panel 12 is pivoted to be locked to the main housing 11, the inclined guide surface 228 of each of the hooks 223 is moved to be in sliding contact with the wall 112 of the main housing 11 to consequently move the extension plate 221 upwardly. By virtue of the inclined guide surface 228 of each of the hooks 223 being inclined relative to the extension plate 221 and contacting with the wall 112 of the main housing 11, the hooks 223 are guided to move upwardly and respectively towards the engagement slots 113 in a manner where the extension plate 221 is moved upwardly relative to the window panel 12. When the inclined guide surface 228 of each of the hooks 223 moves past the respective engagement slot 113, the extension plate 221, the guide plate 222, and the hooks 223 are moved downwardly by weights of the extension plate 221, the guide plate 222, and the hooks 223 such that the hooks 223 respectively engage with the engagement slots 113 to lock the window panel 12 to the main housing 11 without the key (A). Because the lock device 2 locks the window panel 12 to the main housing 11 without the key (A), operative convenience of the lock device 2 may be increased, and the key (A) may be avoided being negligently left in the lock cylinder 212 after the window panel 12 is locked to the main housing 11.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lock device adapted to be mounted in a game machine, the game machine including a main housing that is formed with a plurality of engagement slots spaced apart from each other in a top-bottom direction, each of the engagement slots being elongated in the top-bottom direction, the game machine further including a window panel that is pivotally connected to the main housing, said lock device comprising:

a lock unit including a lock seat that is adapted to be fixed to the window panel, a lock cylinder that is rotatably connected to said lock seat, that is adapted to extend perpendicularly through the window panel, and that has opposite front and rear ends adapted to be respectively disposed within and outside of the main housing, and an actuating plate that is fixed co-rotatably to said rear end of said lock cylinder, and that extends perpendicularly from said lock cylinder; and an engaging unit including an extension plate that is adapted to be connected to the window panel, and that is adapted to slide upwardly and downwardly relative to the window panel, a guide plate that extends from said extension plate, that is adapted to be parallel to the window panel, and that is disposed over said actuating plate, and a plurality of hooks that are connected to said extension plate, that are adapted to extend perpendicularly away from the window panel, and that are adapted to engage respectively and removably with the engagement slots to lock the window panel to the main housing, each of said hooks having an inclined guide surface that faces away from and is inclined relative to said extension plate;

wherein when said lock cylinder rotates, said actuating plate is driven to rotate to move said guide plate and said hooks upwardly so that said hooks are allowed to be disengaged from the engagement slots to unlock the window panel from the main housing; and wherein said inclined guide surface of each of said hooks is adapted to be in sliding contact with the main housing to consequently move said extension plate upwardly when the window panel is pivoted to be locked to the main housing.

2. The lock device as claimed in claim 1, wherein each of said hooks includes:

a connecting body portion that is connected to said extension plate; and a hook portion that extends downwardly from a distal end of said connecting body portion opposite to said extension plate, and that has said inclined guide surface.

3. The lock device as claimed in claim 2, wherein said hook portion of each of said hooks further has an upright surface that faces said extension plate and that has a bottom end connected to said inclined guide surface.

4. The lock device as claimed in claim 1, wherein:

said extension plate is formed with at least one sliding slot that is elongated in the top-bottom direction; and said lock device further comprises at least one limiting member that extends perpendicularly through said at least one sliding slot and that is adapted to be secured onto the window panel.

* * * * *